US007164082B2

(12) United States Patent
Kurek et al.

(10) Patent No.: US 7,164,082 B2
(45) Date of Patent: Jan. 16, 2007

(54) ELECTRICAL WIRING DEVICES WITH INNOVATIVE EMBODIMENTS

(75) Inventors: Stephen R. Kurek, Rego Park, NY (US); Anthony Tufano, North Massapequa, NY (US); Emma Levin, Brooklyn, NY (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 0 days.

(21) Appl. No.: 11/088,755

(22) Filed: Mar. 25, 2005

(65) Prior Publication Data

US 2005/0287848 A1 Dec. 29, 2005

Related U.S. Application Data

(60) Provisional application No. 60/559,925, filed on Apr. 5, 2004.

(51) Int. Cl.
*H02G 3/08* (2006.01)

(52) U.S. Cl. ............................ 174/53; 174/51; 174/57; 439/801; 439/782; 220/3.7

(58) Field of Classification Search .................. 174/51, 174/57, 53, 35 R, 65 R, 138 G; 220/3.7; 439/801, 781, 782, 107
See application file for complete search history.

(56) References Cited

U.S. PATENT DOCUMENTS 5,866,844 A * 2/1999 Osterbrock et al. ........... 174/51

* cited by examiner

*Primary Examiner*—Dhiru R. Patel
(74) *Attorney, Agent, or Firm*—Paul J. Sutton

(57) ABSTRACT

A wiring device common in household circuits includes a flexible brush that is a separate piece from a screw plate that receives electrical power. A terminal screw can thread into the screw plate. The brush may be positioned between the screw plate and the head of the terminal screw and can have a clearance hole through which the threads if the terminal screw can pass. Good electrical and thermal conductivity is assured between the screw plate and the brush by tightening the screw. A ground strap can be employed to hold a cover to a base of the electrical device. The strap can include openings which engage snap tabs on the cover to lock all components into a complete assembly. The strap also can have hooks which engage the cover to prevent the cover from being pulled out of the strap. The wiring device can be an electrical switch, a receptacle, or any similar type of device.

3 Claims, 5 Drawing Sheets

ELECTRICAL WIRING DEVICES WITH INNOVATIVE EMBODIMENTS

This application claims the benefit of the filing date of a provisional application having Ser. No. 60/559,925 which was filed on Apr. 5, 2004.

BACKGROUND

1. Field of the Invention

The present invention generally relates to wiring devices.

2. Description of the Related Art

Wiring devices such as receptacles and switches used in household wiring may require reliable operation at low cost. To succeed in the marketplace, successful devices are more economical to produce, are reliable in operation and, when assembled, form a unitary assembly that strongly resists disassembly than competing products.

SUMMARY OF THE INVENTION

A wiring device such as a switch includes a flexible brush that is a movable contact and is a separate piece from a screw plate. A terminal screw can thread into the screw plate. The brush may be positioned between the screw plate and the head of the terminal screw. In an implementation, the brush can have a clearance hole through which the threads of the terminal screw can pass. Good electrical and thermal conductivity is assured between the screw plate and the brush by tightening a terminal screw into the screw plate.

A ground strap can be employed to hold a cover to a base of the electrical device. The strap can include openings which engage snap tabs on the cover to lock all components into a complete assembly. The strap also can have hooks which engage the cover to prevent the cover from being pulled out of the strap. The wiring device can be an electrical switch, a receptacle, or any similar type of device.

Some implementations of the disclosure have the advantage that there is no need for the brush of an electrical switch device to be permanently attached to the screw plate that can be coupled to the AC power line.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest terms.

BRIEF DESCRIPTION OF THE DRAWINGS

Other aspects, features and advantages of the present invention will become more apparent from the following detailed description, the appended claims and the accompanying drawings in which similar elements are given similar reference numerals.

DETAILED DESCRIPTION

Figure 1:
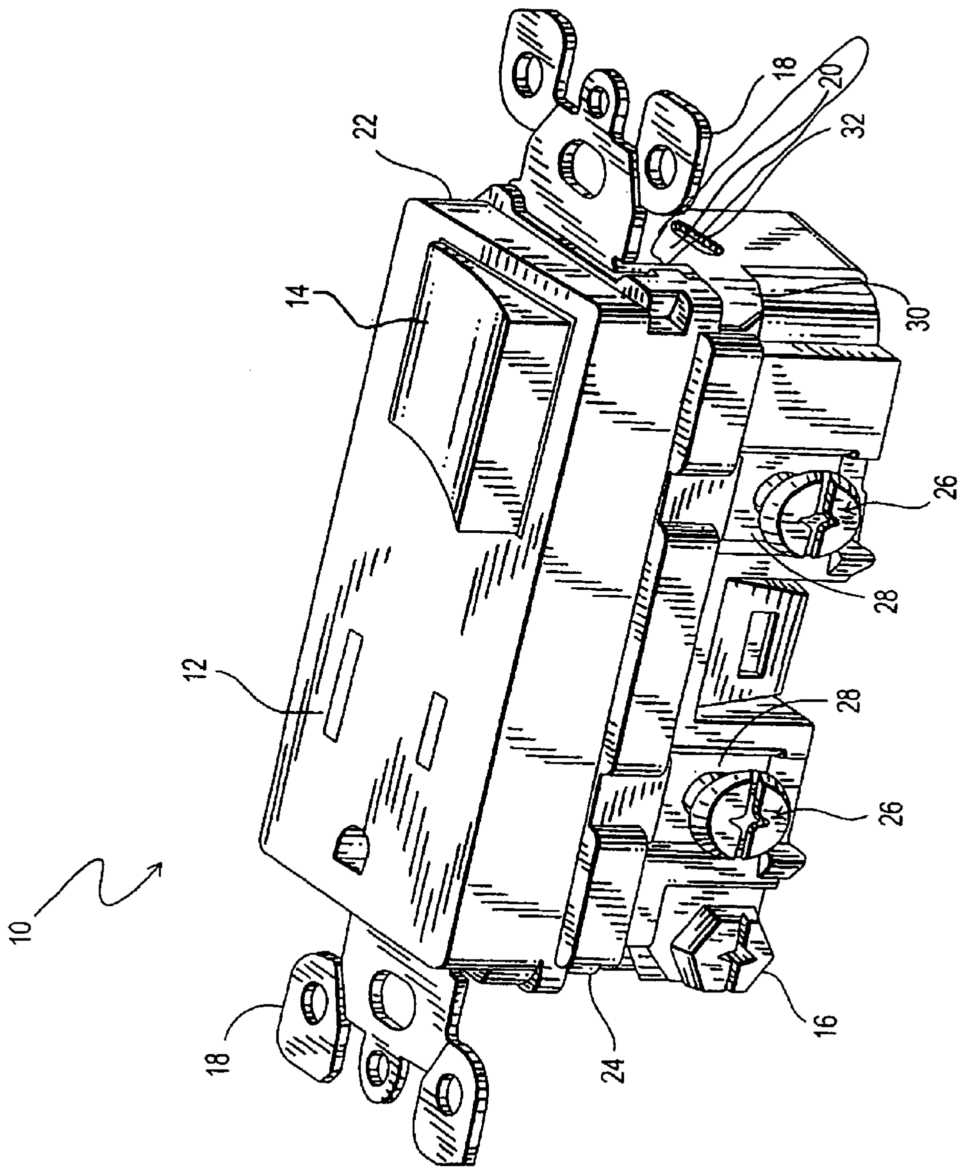
FIG. 1 is an isometric of an assembled wiring device.

FIG. 1 is an isometric side view of an assembled electrical device 10 including a rocker switch 14 and a receptacle outlet 12. The electrical device can have a cover 22 and a base 24. A grounding strap 20 can be formed around the base 24 and include mounting brackets 18. The brackets 18 can be used to mount the device to a standard electrical junction box (not shown). The strap 20 can be formed of a conductive material and used to hold together the base 24 and the cover 22 by hooks 30 and snap tabs 32. A grounding screw 16 which is electrically connected to strap 20 can be used to receive a grounding wire of an alternating current (AC) power line. In an implementation, the electrical device includes a toggle switch 14 and a receptacle outlet 12 accessible through the cover 22. A toggle switch or a combination of other functions also may be made accessible through the cover 22. AC power line wires (not shown) may be connected to the device by one or more screw plates 26. The wires can be held in electrical contact with the screw plates 28 by terminal screws 26.

Figure 2:
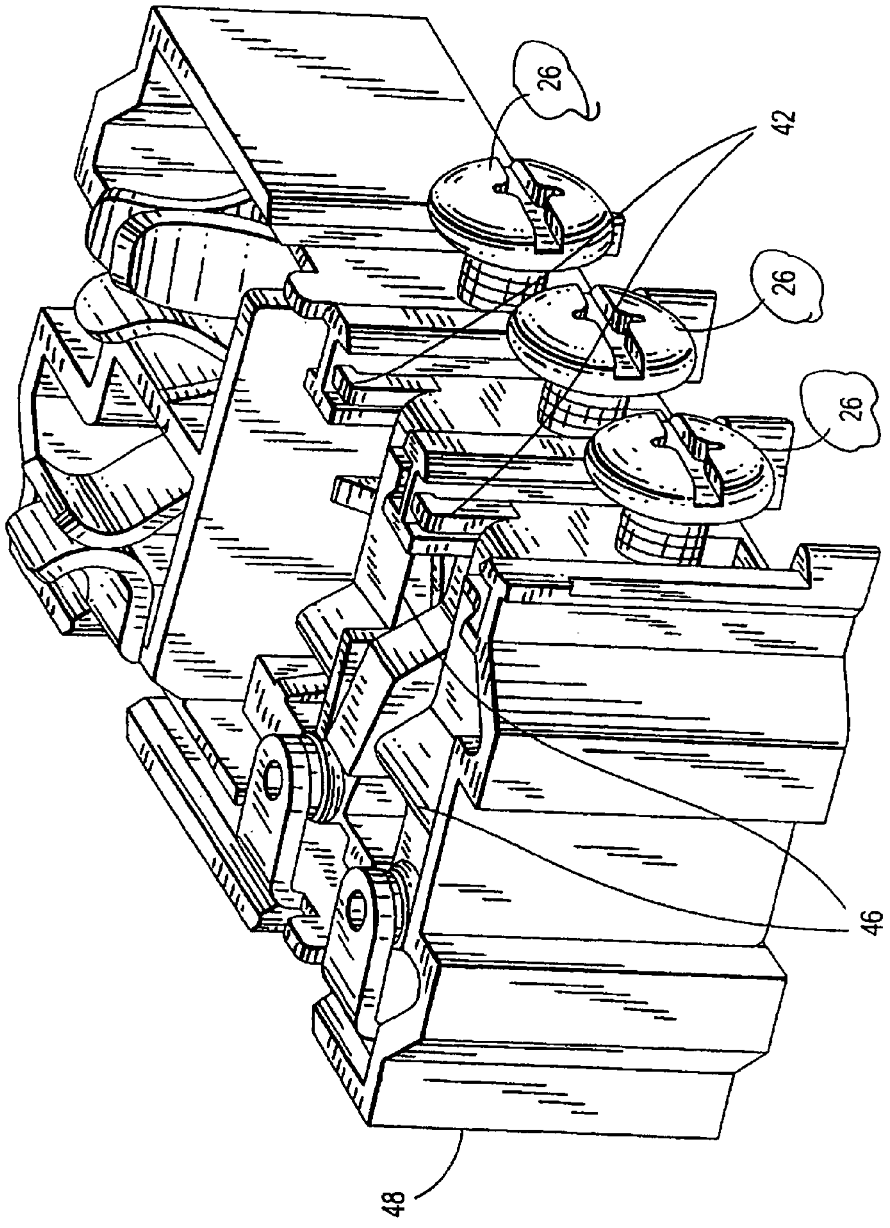
FIG. 2 is a partial cut away isometric of a wiring device showing a flexible brush and a screw plate and their relationship.
Figure 2A:
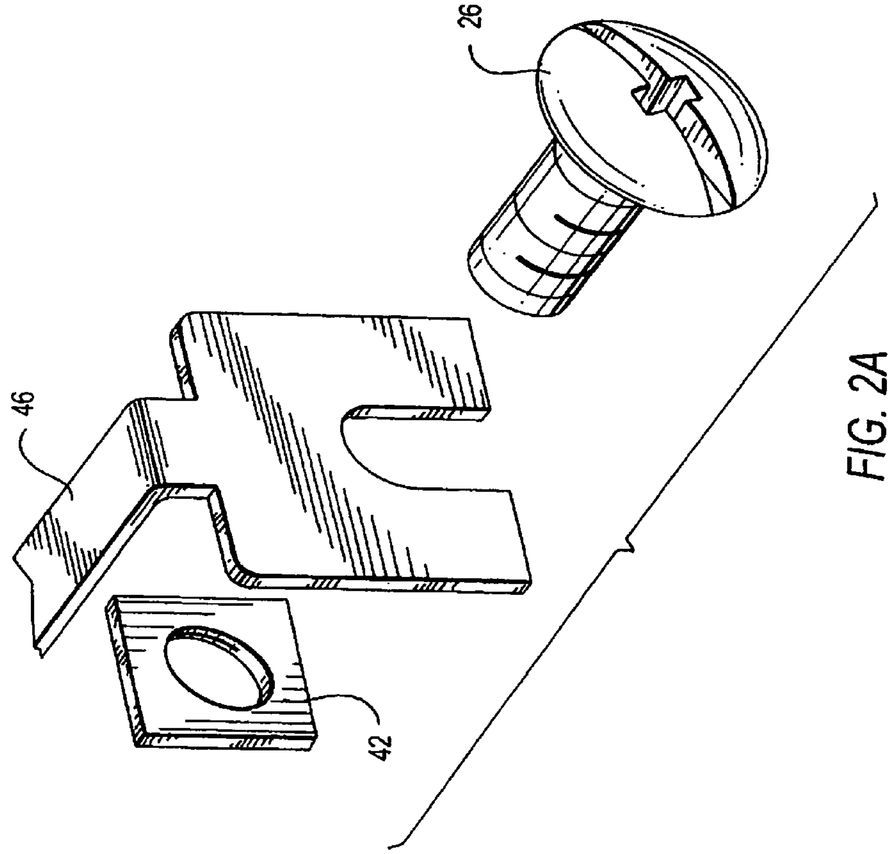

Referring to FIG. 2, there is shown a base 48 of an electrical device in accordance with the present disclosure. One or more flexible brushes 46 can each be trapped between a respective screw plate 42 and a head of a terminal screw 40. The brushes 46 can be movable contacts that may be moved by operation of the switch 14 and can be of copper alloy having high strength and conductivity. The brush 46 is not permanently attached to the screw plate 42. The screw plate 42 can be of a heavy gauge conductive material for strength and have good electrical conductivity. Each terminal screw 40 can thread into a respective screw plate 42. The terminal screw 40 is adapted to receive and trap a conductive wire of the AC power line (not shown) under its head. Good electrical connection is made between the brush 46, respective screw plate 42 and the conductive wire of the AC power line under the head of the terminal screw 40 by tightening the terminal screw 40 into the screw plate 42. A prior art one piece integral brush/terminal screw part is not required and the flexible brush is not permanently connected to the screw plate.

Figure 3A:
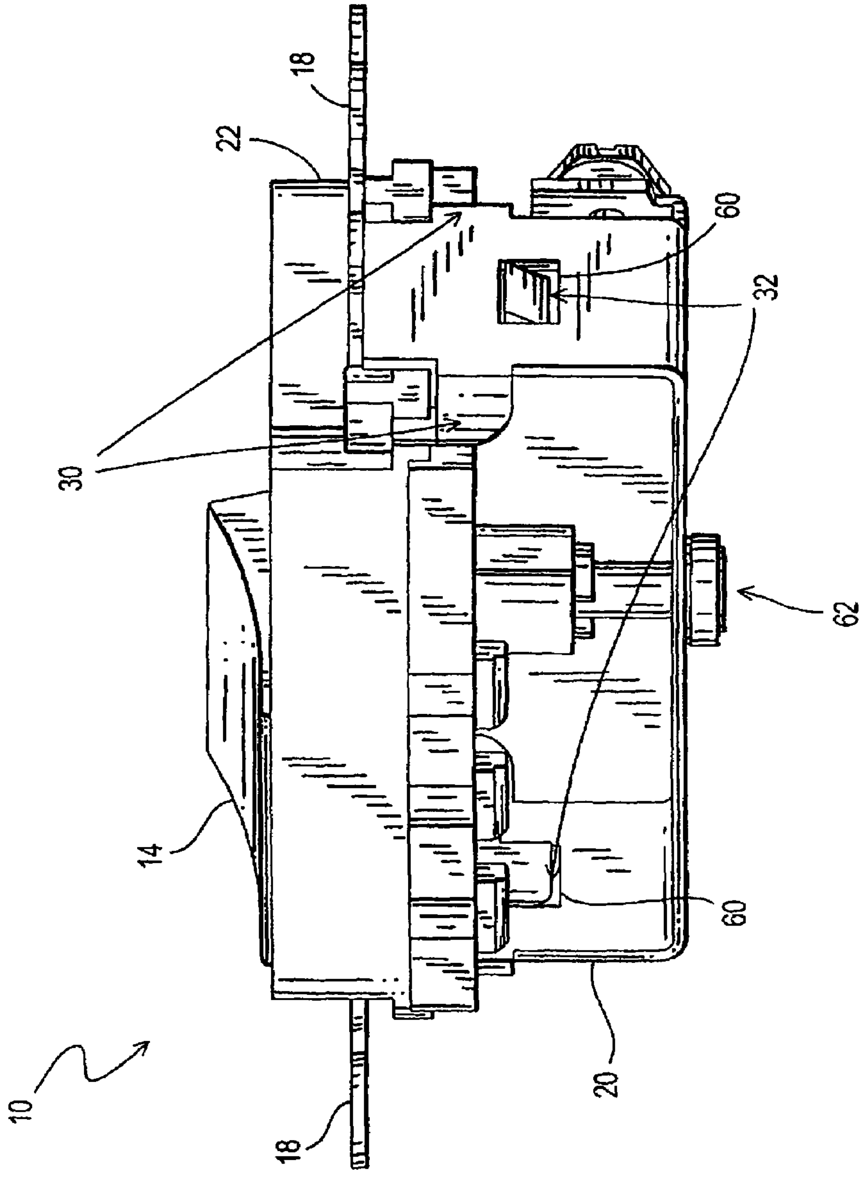
FIG. 3A–3B illustrate the cover of an electrical device coupled to a strap.
Figure 3B:
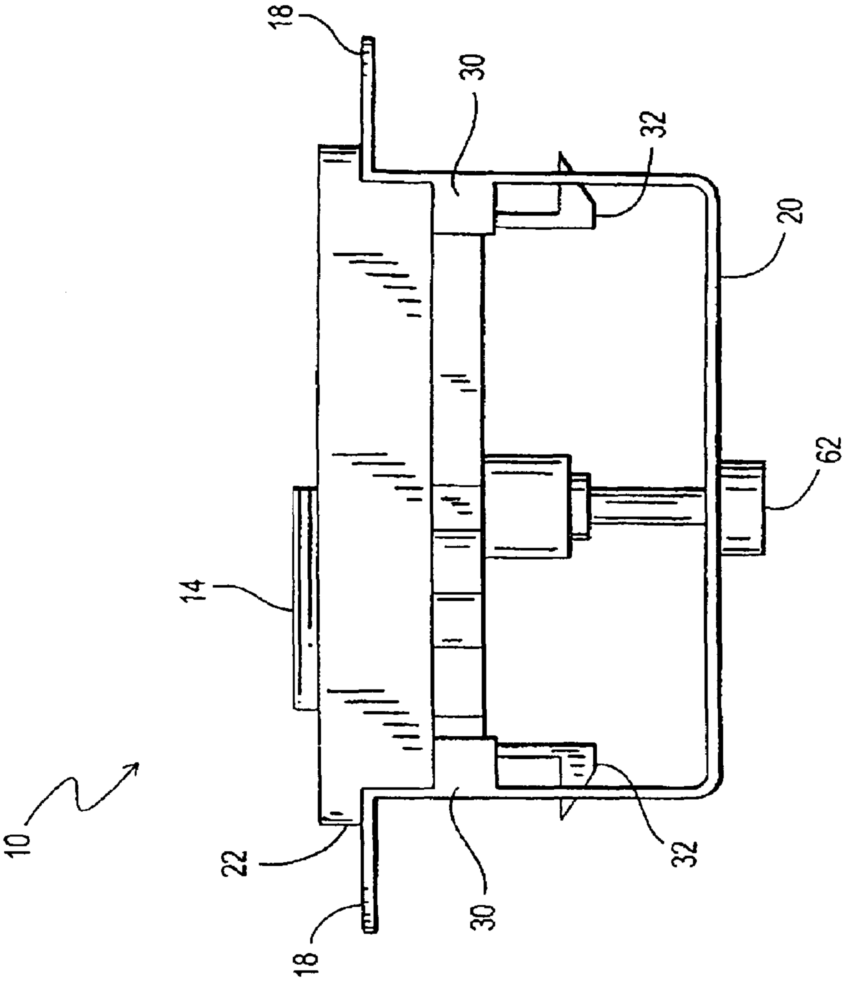

Referring to FIGS. 3A–3B, there is shown a perspective side view (FIG. 3A) and a side view (FIG. 3B) of the electrical device 10 of FIG. 1. The grounding strap 20 can have hooks 30, which can engage the cover 22 of the wiring device 10. The grounding strap 20 also can include openings 60 which can engage snap tabs 32 on the cover 22. The snap tabs 32 can be attached to the cover 22 so that the snap tabs can bend out of the way of the grounding strap 20 during assembly. As the grounding strap 20 is assembled to the cover 22, the strap can cause the snap tabs 32 to flexed inwards of the strap until the snap tabs reach the openings 60. The snap tabs 20 can snap into the openings 60. This arrangement can help prevent the cover 22 of the wiring device from being pulled out of the grounding strap 20 and locks all of the components of the assembled wiring device together. A screw or rivet also may be added to secure the strap 20 to the wiring device cover 22 to provide additional security.

While there have been shown and described and pointed out the fundamental novel features of the invention as applied to the preferred embodiments, it will be understood that various omissions and substitutions and changes of the form and details of the apparatus illustrated and in the operation may be done by those skilled in the art, without departing from the spirit of the invention.

What is claimed is:

1. A wiring device comprising:

a base member coupled to a cover member;

a strap having hooks for engaging the cover member of the wiring device to restrict the removal of the wiring device from the strap;

a screw plate held captive by said base member and having a threaded opening for receiving a terminal screw having a head; and at least one flexible brush of conductive material located between the screw plate and the head of the terminal screw, wherein electrical connection is established between the at least one flexible brush and the screw plate by tightening the terminal screw.

2. The wiring device of claim 1, wherein the strap is coupled to the base member by a rivet.

3. The wiring device of claim 1, wherein the strap is coupled to the base by a screw.

* * * * *